United States Patent [19]

Iizuka

[11] Patent Number: 5,415,004
[45] Date of Patent: May 16, 1995

[54] CONTROL DEVICE OF AIR CONDITIONER FOR AUTOMOTIVE VEHICLE

[75] Inventor: Naonori Iizuka, Fuji, Japan
[73] Assignee: Jatco Corporation, Fuji, Japan
[21] Appl. No.: 107,144
[22] Filed: Aug. 17, 1993

[30] Foreign Application Priority Data

Sep. 28, 1992 [JP] Japan .................... 4-282454

[51] Int. Cl.⁶ .................................. B60H 1/32
[52] U.S. Cl. ............................. 62/133; 62/158
[58] Field of Search ............. 62/133, 243, 323.4, 62/158

[56] References Cited

U.S. PATENT DOCUMENTS

| | | | |
|---|---|---|---|
| 4,135,368 | 1/1979 | Mohr et al. | 62/323.4 X |
| 4,206,613 | 6/1980 | Shockley | 62/133 |
| 4,269,033 | 5/1981 | Birch | 62/133 |
| 4,275,688 | 6/1981 | Abe et al. | 62/133 X |
| 4,488,410 | 12/1984 | Seiderman | 62/133 |
| 4,688,530 | 8/1987 | Nishikawa et al. | 62/323.4 X |

FOREIGN PATENT DOCUMENTS 63-090420 4/1988 Japan .

Primary Examiner—Harry B. Tanner
Attorney, Agent, or Firm—Foley & Lardner

[57] ABSTRACT

An air conditioner control device is applied to an air conditioner of an automotive vehicle equipped with an automatic transmission. The air conditioner control device controls the on-off switching operation of a compressor of the air conditioner. The control device turns off the operation of the compressor when a signal indicative of accelerating state of an automotive vehicle from a transmission controller is received. Further, the control device restarts the operation of the compressor when the off-time of the compressor becomes larger than a first predetermined time and when a second predetermined time has elapsed form a shifting judgment in the automatic transmission. Therefore, the operation of the air conditioner is stopped during an acceleration of the automotive vehicle and securely restarred after the acceleration.

8 Claims, 3 Drawing Sheets

CONTROL DEVICE OF AIR CONDITIONER FOR AUTOMOTIVE VEHICLE

BACKGROUND OF THE INVENTION

1. Field of the Invention

The present invention relates to improvements in a control device for an air conditioner for use in an automotive vehicle.

2. Description of the Prior Art

JP-A-63-90420 discloses a conventional air conditioner control device for an automotive vehicle. This air conditioner control device is arranged such that the operation of the air conditioner is stopped during an acceleration of the automotive vehicle and restarted according to the up-shift operation of an automatic transmission, in order to prevent the acceleration performance from being lowered by the operation of a compressor of the air conditioner. Accordingly, the operation of the compressor is stopped only during the acceleration period.

However, it is necessary that such a control device provides a detector for detecting input rotation speed of the automatic transmission through the rotation speed of the turbine shaft of a torque converter in order to detect the finish of the up-shift operation. This increases a production cost of the control device. Additionally, the reliability of the control device is effected by the sensor and automatic transmission.

SUMMARY OF THE INVENTION

It is an object of the present invention to provide an improved air conditioner control device which is free of the above-mentioned problems.

In brief, the above object is achieved by an arrangement wherein a compressor of an air conditioner is connected with compressor stopping means and compressor restarting means as shown in FIG. 1. The compressor is stopped by the compressor stopping means when an automotive vehicle is in an accelerating condition and restarted by the compressor restarting means when a proper time is elapsed after a stopping of compressor time and a start of the shifting operation in an automatic transmission.

More specifically, a first aspect of the present invention resides in a control device of an air conditioner for an automotive vehicle. The air conditioner has a compressor for generating a refrigerating cycle. The automotive vehicle has an internal combustion engine with an automatic transmission. The control device comprises a compressor stopping means which stops the compressor during an acceleration of the automotive vehicle and a compressor starting means which restarts the compressor when a first predetermined time has elapsed from the stopping of the compressor and a second predetermined time has elapsed from judgment of shifting of the automatic transmission.

A second aspect of the present invention is deemed to comprise a method of controlling a compressor of an air conditioner for an automotive vehicle which has an internal combustion engine with an automatic transmission. The method featuring the steps of: stopping the compressor during an acceleration of the automotive vehicle; and starting the compressor when a first predetermined time has elapsed from the stopping of the compressor and when a second predetermined time has elapsed from a start of shifting of the automatic transmission.

With this arrangement, it becomes unnecessary to provide a detector for detecting a rotation speed of a turbine of a torque converter of an automatic transmission. Furthermore, a correct operation of the air conditioner is maintained against troubles in the detector or the torque converter.

DETAILED DESCRIPTION OF THE INVENTION

Figure 1:
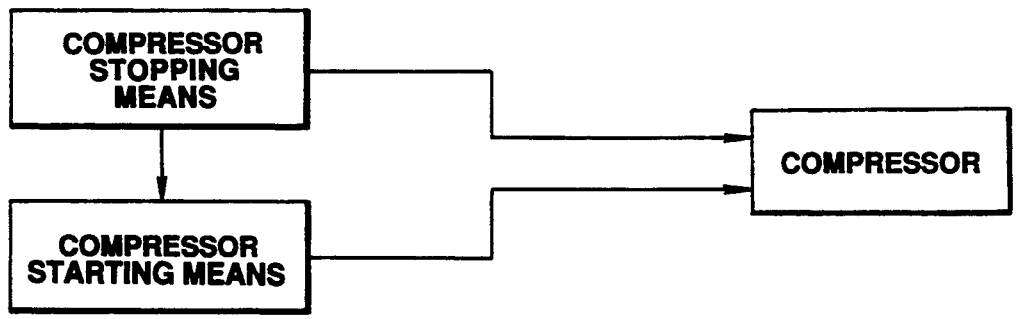
FIG. 1 is a block diagram which shows a conceptual structure of an air conditioner control device according to the present invention.
Figure 2:
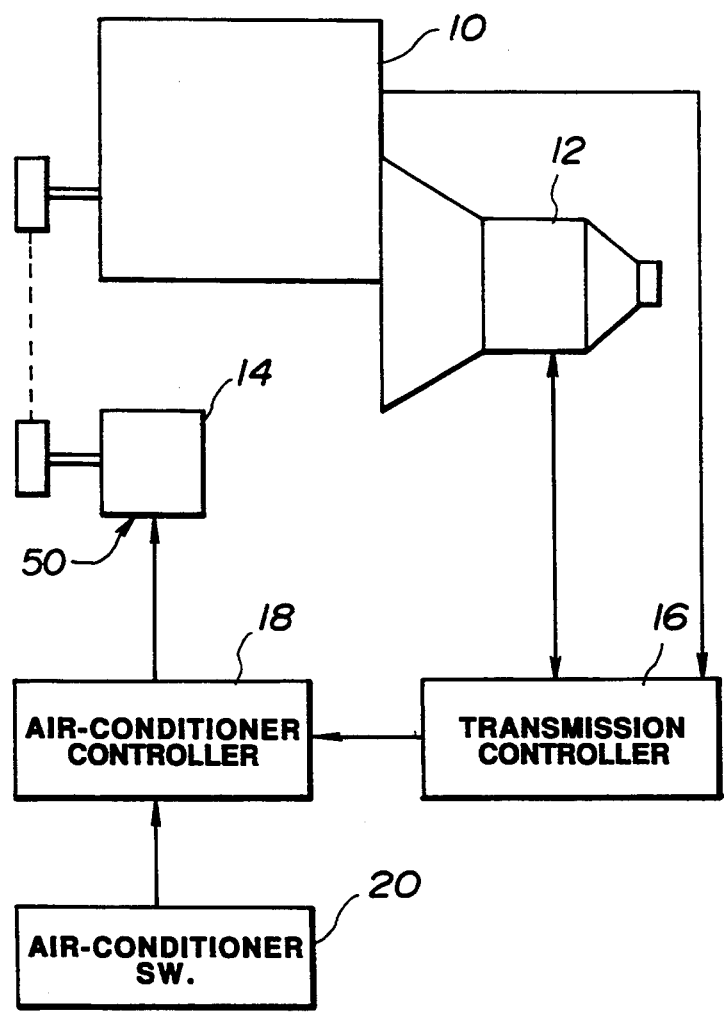
FIG. 2 is an embodiment of an air conditioner control device according to the present invention.
Figure 3:
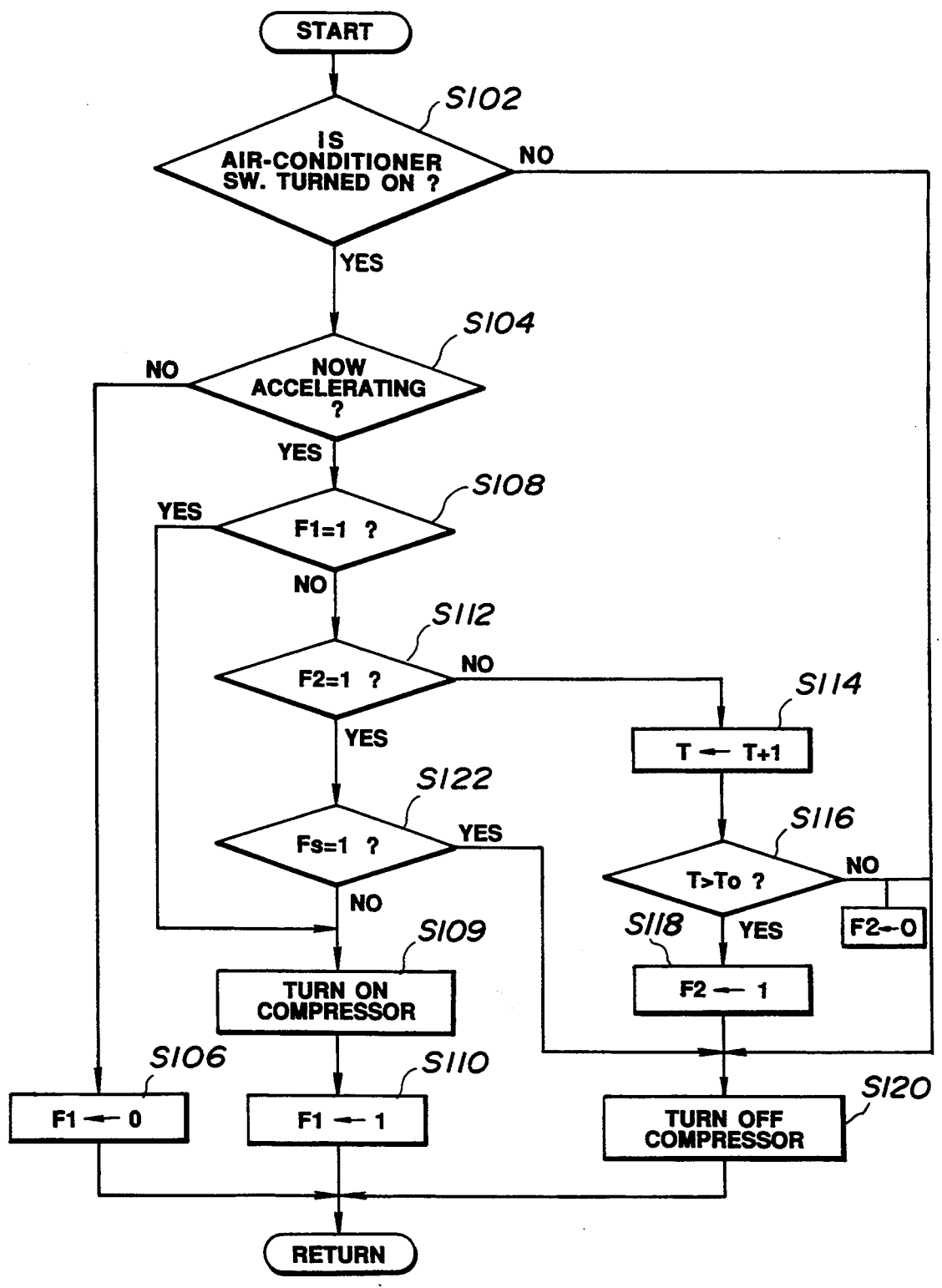
FIG. 3 is a flow chart which shows a control manner of an air-conditioner control device of FIG. 2.
Figure 4:
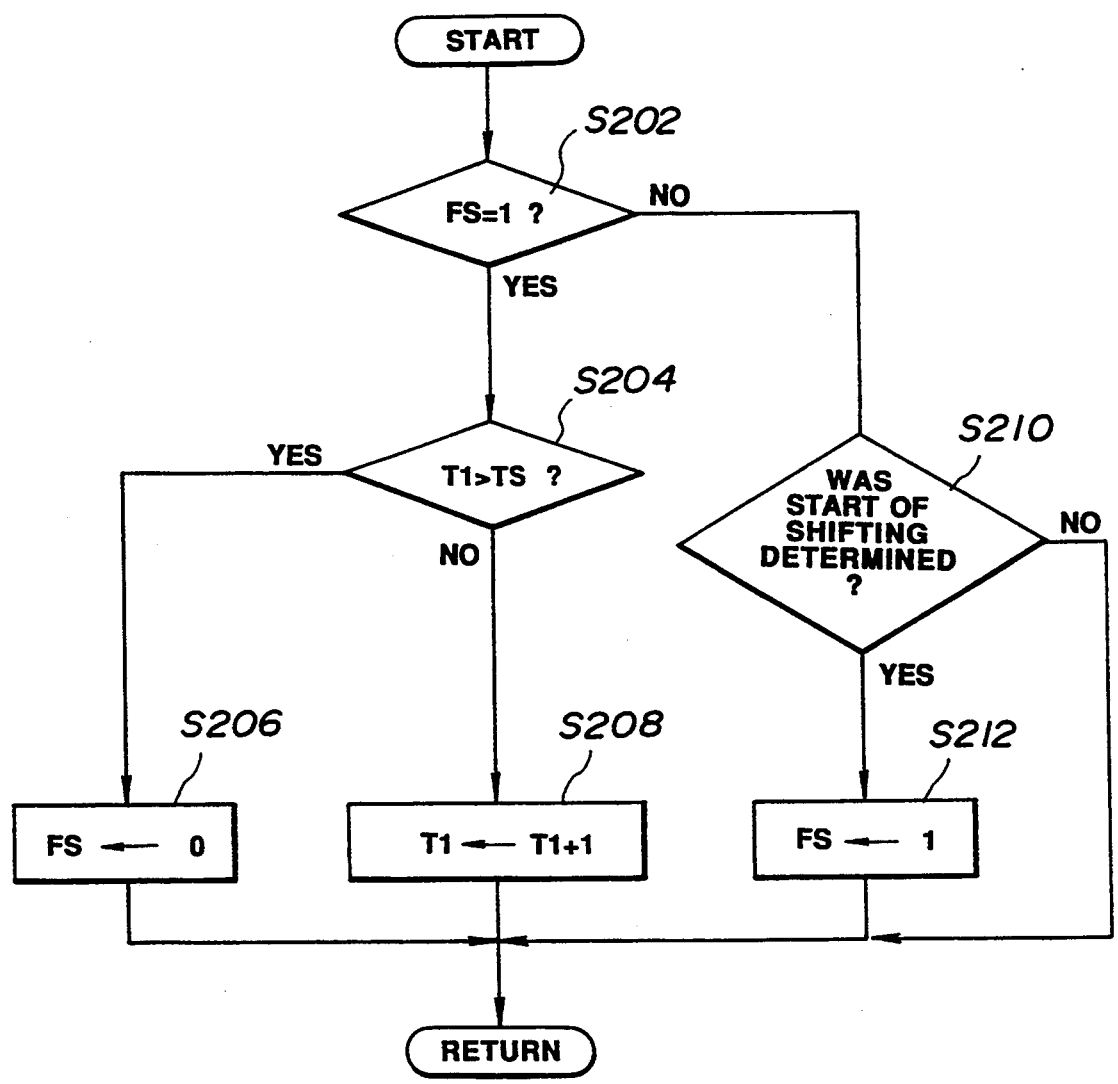
FIG. 4 is another flow chart relating to the flow chart of FIG. 3.

Referring to FIG. 2 to 4, there is shown an embodiment of an air conditioner control device according to the present invention.

As shown in FIG. 2, an automatic transmission 12, which is constituted by a torque converter, a shifting gear mechanism and a hydraulic circuit, is connected with an internal combustion engine 10. An air conditioner 50 for conditioning a passenger compartment of an automotive vehicle comprises a compressor 14, a condenser (not shown), an expansion valve (not shown) and an evaporator (not shown) which make a refrigerating cycle. The air conditioner 50 provides cool air into a passenger compartment of the automotive vehicle by means of its refrigeration system. The compressor 14 of the air conditioner 50 is connected with the internal combustion engine 10 through pulleys and a belt to be operated according to the operation of the internal combustion engine 10. The automatic transmission 12 is electrically connected with an automatic transmission controller 16 through which the operation of the automatic transmission 12 is controlled. The compressor 14 is electrically connected with and controlled by an air conditioner controller 18. The automatic transmission controller 16 is arranged to output signals indicative of judgment of shifting, accelerating time and the like to the air conditioner controller 18. Furthermore, a signal indicative of the switching of the air conditioner is outputted from an air conditioner switch 20 to the air conditioner controller 18. The air conditioner switch 20 is manually turned on and off by a passenger of the automotive vehicle. The air conditioner controller 18 controls the on-off switching operation of the compressor 14 by controlling a magnetic clutch (not shown) installed in the compressor 14 according to the signals from the automatic transmission controller 16 and the air conditioner switch.

Such control operations of the air conditioner controller 18 will be discussed in detail with reference to a flow chart of FIG. 3.

A program shown by this flow chart is repeatedly implemented from a time that an ignition switch of the automotive vehicle turned on. After starting of the program, in a step S102, it is judged whether the air conditioner switch 20 is turned on or not. When the air conditioner switch 20 is not turned on, the program proceeds to a step S120 wherein the compressor 14 is turned off. When the air conditioner switch 20 is turned on, the program proceeds to a step S104 wherein it is judged whether the automotive vehicle is in an accelerating condition or not. Such a judgment in the step S104 is implemented on the basis of a throttle opening and a shift-position in the automatic transmission 12. This information of the engine 10 and the automatic transmission 12 is sent through the automatic transmission controller 16 to the air conditioner controller 18.

When the automotive vehicle is not in an accelerating condition, the program proceeds from the step S104 to a step S106 wherein a flag F1 indicative of a predetermined accelerating condition of the automotive vehicle is set at 0. When the automotive vehicle is in an accelerating condition, the program proceeds to a step S108 wherein it is judged whether the flag F1 is 1 or not. When the judgment in the step S108 is "YES", the program proceeds to a step S109 wherein the compressor 14 is turned on. When the judgment in the step S108 is "NO", the program proceeds to a step S112 wherein it is judged whether a flag F2 is 1 or not. When the judgment in the step S112 is "NO" (F2=0), the program proceeds to a step S114. The flag F2 indicates an elapsed time, that is, F2=1 represents that a time period, during which the compressor 14 is in a turned-off condition, is larger than a predetermined time period T0, and F2=0 represents that the time period, during which the compressor 14 is in a turned-off condition, is smaller than the predetermined time period T0.

In the step S114, a time T of a time counter is incremented by 1 (T←T+1). Following this, in a step S116 it is judged whether the time T is larger than the predetermined time period T0 or not. When the time T is larger than the predetermined time period T0, the program proceeds to a step S118 wherein the flag F2 is set at 1 (F2←1). On the other hand, when the judgment in the step S112 is "YES" (F2=1), the program proceeds to a step S122 wherein it is judged whether a flag FS is 1 or not. The flag FS is determined from a flow chart shown in FIG. 4. The flag FS indicates another elapsed time which is larger than a predetermined time TS which is an elapsed time from the judgment of the shifting. That is, FS=1 represents that an elapsed time from the judgment of shifting (second predetermined time) is not larger than the predetermined time TS, and FS=0 represents that the elapsed time from the judgment of the shifting is larger than TS. When the judgment in the step S122 is "NO", the program proceeds to the step S109 wherein the compressor 14 is turned on. Following this, in a step S110 the flag F1 is set at 1 (F1←1). When the judgment in the step S122 is "YES", the program proceeds to a step S120 wherein the compressor 14 is turned off.

The process for determining the flag FS will be discussed with reference to the flow chart shown in FIG. 4. A program shown by the flow chart in FIG. 4 is repeatedly implemented after the turning-on of the ignition key.

In a step S202, it is judged whether the flag FS is 1 or not. When FS=1, the program proceeds to a step S204 wherein it is judged whether a time T1 becomes larger than the predetermined time TS or not. When the judgment in the step S204 is "YES" (T1>TS), the program proceeds to a step S206 wherein the time TS set at 0 (FS←0). When the judgment in the step S204 is "NO" (T1≧TS), the program proceeds to a step S208 wherein the time T1 is incremented by 1 (T1←T1+1). On the other hand, when FS is not 1 (FS≠1), the program proceeds to a step S210 wherein it is judged whether the start of the shifting was determined. When the start of the shifting is determined, the program proceeds to a step S212 wherein FS is set at 1 (FS←1). Following this, the program is returned to the start of the flow chart.

Consequently, with the above-mentioned control, when the air conditioner switch 20 is turned on and the automotive vehicle is accelerated, the compressor 14 is turned off. Such an operation corresponds to the implement of the steps S102, S104, S108, S112, S114, S116 and S120. When the off-time of the compressor 14 becomes larger than the predetermined time T0 (corresponding to the implement of the steps S116 and S118), that is, when the flag FS becomes 0 (FS=0), the compressor 14 is turned on by the implement of the steps S108, S112, S122, S109. However, when FS is 1, the compressor 14 is not turned on by the implement of the steps S122 and S120. The flag FS is set at 0 when a predetermined time TS has elapsed from the turning-off of the compressor 14 (corresponding to the steps S202, S204 and S206). Accordingly, in case that the time T0 has elapsed from the turning-off of the compressor 14 and the time TS has elapsed from the judgment of the start of the shifting, the operation of the compressor 14 is restarted. Therefore, it not necessary to provide a sensor for detecting the rotation speed of the turbine shaft of the torque converter for the purpose of the control of the air-conditioner. Accordingly, even if the up-shifting can not be carried out due to the breakage of the automatic transmission, the operation of the compressor 14 can be restarred after the elapse of the predetermined time T0 and TS.

Although the invention has been described in its preferred form with a certain degree of particularity, it is understood that the present disclosure of the preferred form has been changed in the details of construction and the combination and arrangement of parts may be resorted to without departing from the spirit and the scope of the present invention has hereinafter claimed.

What is claimed is:

1. A control device of an air conditioner for an automotive vehicle, the air conditioner having a compressor for making a refrigerating cycle, the automotive vehicle having an internal combustion engine with an automatic transmission, said control device comprising:
    means for stopping the compressor when a transmission controller outputs a signal indicative of an acceleration of the automotive vehicle; and
    means for starting the compressor when a first predetermined time has elapsed from the stopping of the compressor and a second predetermined time has elapsed from a time when the transmission controller outputs a signal indicative of a judgment of the shifting of the automatic transmission.

2. A control device as claimed in claim 1, wherein the automotive vehicle is provided with an automatic transmission connected with an internal combustion engine, the automatic transmission being controlled by a transmission controller.

3. A control device as claimed in claim 2, wherein said compressor stopping means stops the operation of the compressor when said compressor stopping means receives signals indicative of the accelerating condition of the automotive vehicle from the transmission controller.

4. A control device as claimed in claim 1, further comprising a first judging means for judging that a stopping time period of the compressor is larger than a first predetermined time and a second judging mean for judging that a second predetermined time elapsed from a shifting judgment of the automatic transmission, said first judging means and said second judging means output the signals to said compressor starting means.

5. A method of controlling a compressor of an air conditioner for an automotive vehicle, said method comprising the steps of:

stopping the compressor when a transmission controller outputs a signal indicative of an acceleration of the automotive vehicle; and starting the compressor when a first predetermined time has elapsed from the stopping of the compressor and a second predetermined time has elapsed from judgment of the shifting of the automatic transmission.

6. An air conditioner system for an automotive vehicle, said air conditioner providing cool air into a passenger compartment of the automotive vehicle by means of its refrigeration cycle, said automotive vehicle comprising an internal combustion engine with an automatic transmission, said air conditioner system comprising:

a compressor rotatingly connected with the internal combustion engine;

a transmission controller outputting a signal indicative of an accelerating condition of the automotive vehicle;

an air conditioner switch by which a passenger of the automotive vehicle switches on the air conditioner system, said air conditioner switch outputting a signal indicative of a turned-on state of the air conditioner system; and an air conditioner controller receiving signals from said transmission controller and said air conditioner switch, said air conditioner controller stopping said compressor when the automotive vehicle is in an accelerating condition, said air conditioner controller starting said compressor when said air conditioner switch is turned on, when a turned-off time period of said compressor is larger than a first predetermined time, and when an elapsed time from when the transmission controller outputs a signal indicative of a judgment of the shifting of the automatic transmission is larger than a second predetermined time.

7. An air conditioner system as claimed in claim 6, wherein the accelerating condition of the automotive vehicle is judged from the shifting of the automatic transmission and an opening degree of an engine throttle.

8. An air conditioner controller for an automotive vehicle including an internal combustion engine with an automatic transmission, said air conditioner controller controlling operation of an air conditioner, the automatic transmission being controlled by a transmission controller, said air conditioner system comprising:

a stopping means for stopping the operation of a compressor of the air conditioner;

a first timer means for counting a first predetermined time when the transmission controller outputs a signal indicative of an acceleration of the automotive vehicle;

a second timer means for counting a second predetermined time when the transmission controller outputs a signal indicative of a judgment of the shifting of the automatic transmission; and a starting means for starting the compressor when the first predetermined time and second predetermined time have both elapsed.

* * * * *